Jan. 27, 1970  J. H. DAVIDSON  3,491,406

DIE ASSEMBLY

Filed July 5, 1967  2 Sheets-Sheet 1

United States Patent Office 3,491,406
Patented Jan. 27, 1970

3,491,406
DIE ASSEMBLY
James H. Davidson, Terre Haute, Ind., assignor to Ethyl Corporation, New York, N.Y., a corporation of Virginia
Filed July 5, 1967, Ser. No. 651,303
Int. Cl. B29d 23/04
U.S. Cl. 18—14                    6 Claims

ABSTRACT OF THE DISCLOSURE

A die assembly for extruding tubular plastic material including a die body having a cylindrical recess. The die body provides an upwardly directed shoulder on an inner wall thereof which shoulder provides an annular recess therein. An annular member is received in the annular recess and faces a downwardly directed shoulder provided on a cylindrical mandrel which is removably positioned within the cylindrical recess in the die body. Means to adjust the position of the annular member relative to the downward directed shoulder of the mandrel is also provided. The die permits entry of plastic material from the bottom thereof and upward flow through spaces provided between the walls of the body and the cylindrical mandrel. The adjustable annular member provides an adjustable restriction which produces a radical change in the thickness of the flowing plastic material whereby "weld lines" are effectively removed from the melt before it reaches the lips of the die.

BACKGROUND OF THE INVENTION

Field of the invention

This invention relates to a die assembly for extruding tubular plastic material. More particularly the invention relates to a die assembly for extruding thin wall, tubular, lay-flat thermoplastic material adapted to be fabricated into thermoplastic film.

Description of the prior art

Numerous designs for dies having annular orifices for extruding thin wall, lay-flat, thermoplastic tubing have been developed particularly since the commercialization of low density polyethylene. The first dies developed were so-called side feed annular dies wherein the body provided a passage through one wall to feed thermoplastic material to the interior of the die. Usually a conical mandrel or core was received within the die body which together defined the annular extrusion passage for the formation of the thin wall lay-flat, thermoplastic tubing. Side feed dies have the disadvantage of causing stagnation and hold-up of the thermoplastic material within the die. Additionally the dies cause a severe weld line in the thermoplastic material where the split streams of plastic rejoin on the back-side of the center post of the mandrel or core. Flat dies of bottom feed design are becoming more popular because of advantages over the side feed dies. A bottom feed annular die provides an even flow of thermoplastic material throughout the passageways in the die with no hold-up to cause degradation of the plastic material. These dies are readily disassembled and more easily cleaned than the side feed dies. However, there have been problems of maintaining alignment and of preventing weld lines from the spiders normally provided in these dies.

A construction for a flat, bottom feed die of improved characteristics is shown in U.S. Patent 3,296,662.

SUMMARY OF THE INVENTION

It is an object of the present invention to provide a die assembly for extruding tubular thermoplastic material which provides better gauge control for the extruded plastic material.

It is also a further object of this invention to provide a die assembly which can be more accurately adjusted in a shorter length of time than presently available die assemblies.

It is also an object of this invention to provide a die assembly which can be readily disassembled for easy cleaning and maintenance.

It is a still further object of this invention to provide a die assembly which has the capability of producing thin wall plastic tubing that has few or no defects or weld lines in the wall of the tubing.

It is another object of the present invention to provide a die assembly which undergoes little or no physical distortion when subjected to high internal pressures.

The foregoing objects and other advantages brought out hereinafter are realized in a die assembly for extruding tubular thermoplastic material which includes a die body having a cylindrical recess therein. The die body provides at least one upwardly directed shoulder on the inner wall thereof which shoulder provides an annular recess therein. A cylindrical mandrel is received in the cylindrical recess provided in the die body. An annular member is received in the annular recess and means are provided to adjust the position of the annular member relative to the cylindrical mandrel.

In addition to the features set forth above the die of the present invention provides an adjustable annular outer lip ring which can be positioned to adjust the opening between the die lips whereby variations in the gauge of the extruded thermoplastic material can be very accurately controlled. Control to ±10 percent is easily achieved with the present die in a setting time of 1.5 hours or less. Conventional dies having only horizontal adjustment require up to six hours to set and can achieve only a ±15 percent gauge control. Additionally the die of the present invention provides an internal restrictor ring which can be independently adjusted to set the width of an annular space through which the molten thermoplastic material flows whereby weld lines in the plastic media flowing through the die are washed out. The restrictor ring can be conveniently adjusted for different plastic media having entirely different flow properties. Thus the die of the present invention can be utilized in extruding a far larger variety of thermoplastic materials having widely varying flow indices than dies heretofore used. The rugged construction and design of the die permits accurate anchoring of the mandrel within the body of the die. The die can be subjected to high extruding pressures without the mandrel lifting up from the cup or body. Many dies with a conical or side entry feature suffer from the inability to retain their fixed positions when subjected to the high pressures generated in thermoplastic film extrusion.

DESCRIPTION OF THE PREFERRED EMBODIMENTS

Figure 1:
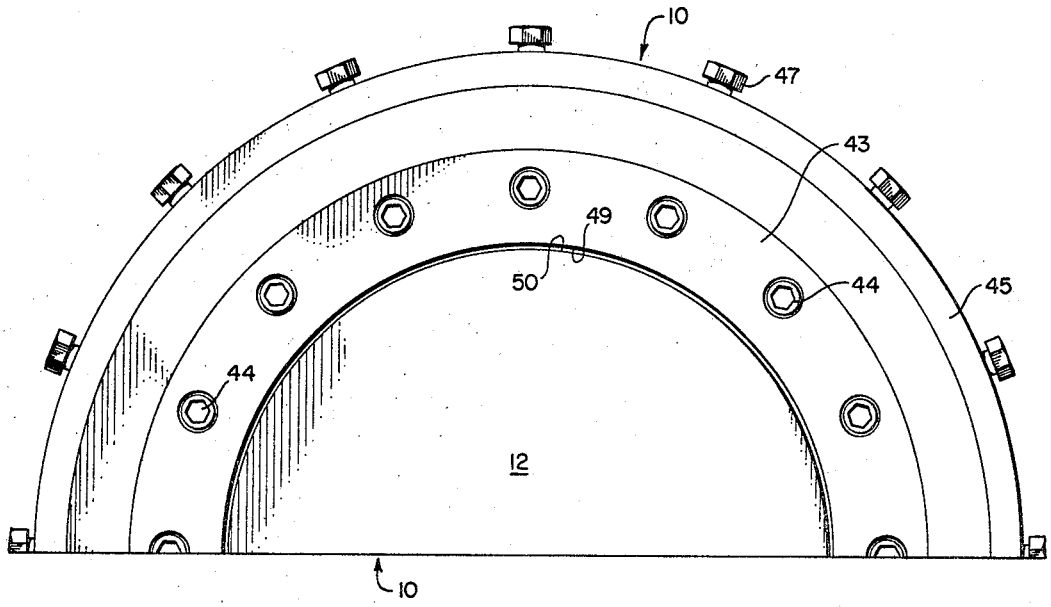
FIGURE 1 is a plan view of one half of a die constructed in accordance with the present invention.
Figure 2:
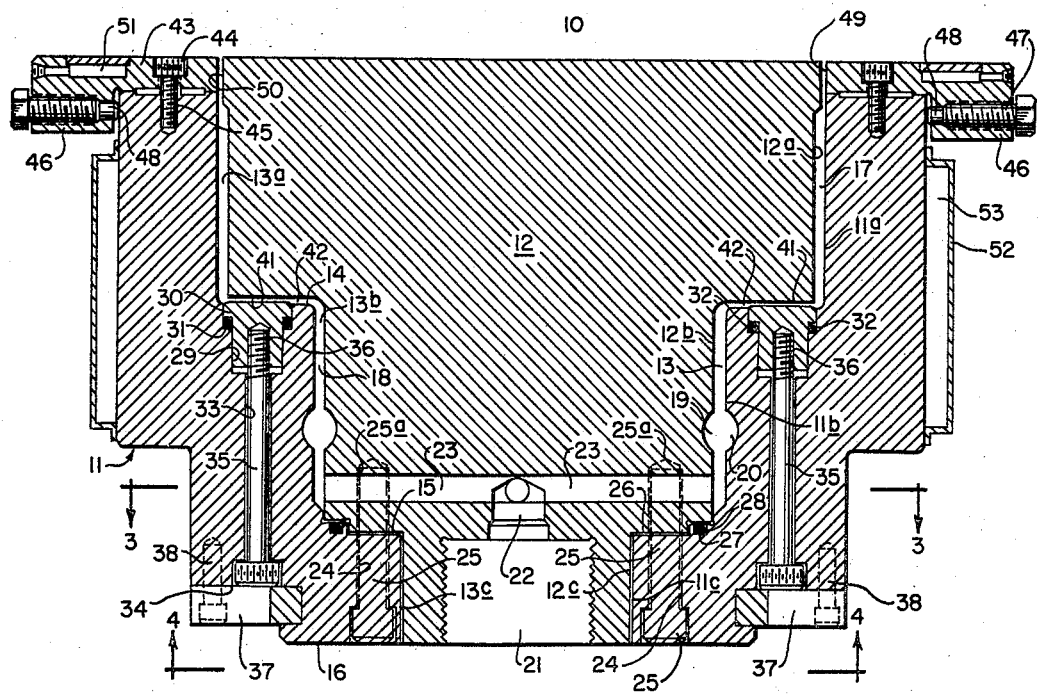
FIGURE 2 is an axial sectional view of the die of FIGURE 1.

Referring now to FIGURES 1 and 2 of the invention the die assembly, designated generally by the numeral 10, includes a cup or body portion 11 together with a core or mandrel portion 12. The body portion 11 of the die is provided with a cylindrical recess 13 therein. The recess 13 is divided into three major sections each having a different diameter. The upper portion 13a of recess 13 has the largest diameter and is defined by the top of the body portion 11 and the upwardly facing first shoulder 14 provided at an intermediate location on the inner wall of the die body 11. The intermediate or central portion of 13b of recess 13 has an intermediate diameter and is defined by first shoulder 14 and second shoulder 15 provided by the wall of the body 11 near its bottom. The bottom portion 13c of recess 13 is defined by the second upwardly facing shoulder 15 in the bottom surface 16 of the die body 11. The recess 13c extends through the bottom surface 16 of the die body to provide an opening therethrough.

The core or mandrel portion 12 of the die assembly is of generally cylindrical shape and has portions thereof which correspond substantially to the shape of the various sections of the cylindrical recess 13a, 13b and 13c, provided in the body portion 11. The upper portion of the mandrel 12a has a width slightly less than the diameter of the upper portion 13a of recess 13 and has outer walls substantially parallel to and spaced from the inner wall of the upper portion 11a of the body. The annular space 17 provided between the inner wall of the upper body portion 11a and the upper portion of the mandrel 12a provides a flow space for the thermoplastic material immediately prior to extrusion from the lips of the die. The central portion 12b of the mandrel 12 has a diameter slightly less than the central portion 13b of the recess. Its walls are perpendicular to and spaced from the wall of the central portion 11b of the body 11 to provide an annular space 18 for upward flow of the thermoplastic material through the die. The wall portion of the central portion 12b of the mandrel has provided therein an outwardly facing semi-circular groove 19. The central portion 11b of the body provides a corresponding inwardly facing semi-circular groove 20 in its surface. The lower portion 12c of the mandrel is cylindrical and extends through the recess 13c and is slightly spaced from the walls of the lower portion 11c of the body 11.

Figure 3:
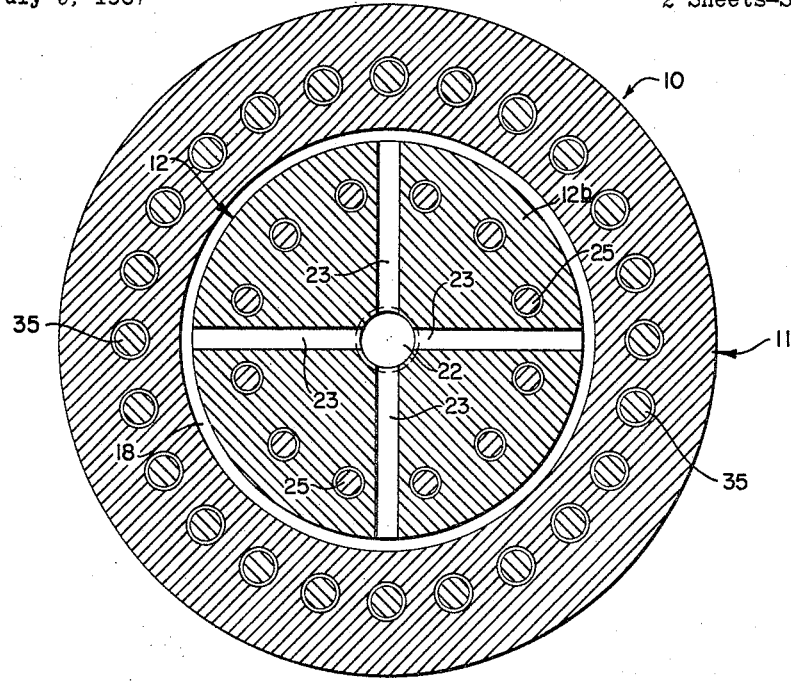
FIGURE 3 is a cross sectional view of the die of FIGURE 2 along the line 3—3.

Referring now to FIGURES 2 and 3 the bottom of the mandrel 12 provides a threaded bore 21 therein. The threaded bore 21 is adapted to receive the coupling to the plastic extruding apparatus for entry of the thermoplastic material into the die assembly 10. A small opening 22 extends from the bottom of threaded bore 21 and communicates with a plurality of radially directed channels 23 which extend through the lower section of the central portion 12b of the mandrel. The channels 23 convey the thermoplastic material to the annular space 18 provided in the central portion of the die. As shown in FIGURES 2 and 3 the radially directed channels 23 are conveniently provided by drilling transverse openings through the wall of the central portion 12b of the mandrel to communicate with opening 22. However, if desired the channels may be provided by fabricating the upper and central portion of the mandrel 12 in one piece and making the lower portion 12c of the mandrel as a separate piece and joining the two by welding or bolts using spacers or spiders to define the channels. While the channels shown in the mandrel of the drawings are depicted as being cylindrical and of a constant diameter it is to be understood that these channels may have any size and be any shape desired. The portions of the mandrel 12 which define the channels 23 may be tapered in parabolic shape or any other geometrical configuration desired in order to provide adequate passage for the thermoplastic material through the lower central portion of the mandrel 12. Specifically the channels 23 may have any of the configurations shown in the die depicted and described in U.S. Patent 3,296,662. While the drawing depicts a die with four channels the invention is not limited thereto and any number of channels desired may be provided consistent with maintaining the strength and integrity of the mandrel portion 12 of the die assembly 10.

A plurality of countersunk circumferentially spaced unthreaded bores 24 extend through the lower portion of the body 11 defined by the second shoulder 15 and the bottom surface 16 of the body. A plurality of cap screws 25 extend through the bores 24 and have their threaded ends received in threaded tapped bores 25a provided in mandrel 12 circumferentially around the shoulder 26 located opposite second shoulder 15 in the body. The second shoulder 15 in the body 11 and the facing matching shoulder 26 in the mandrel 12 each have stepped portions at the circumferential extremities thereof. The stepped portion of the shoulder 15 provided in the body 11 has an annular groove 27 provided therein which receives an O-ring 28 to effectively seal the flow of thermoplastic material from leaking from annulus 18 to the outside of the die. By tightening cap screws 25 the mating portions of the stepped shoulders 15 and 26 are forceably contacted and effectively sealed by the O-ring 28.

Referring to FIGURE 2 the upwardly facing first shoulder 14 provided in the inner wall of the body 11 is provided with an annular recess 29. The recess has positioned therein an annular restrictor ring 30 of conforming shape. The recess 29 is provided with a slightly counterbored upper portion 31 which defines two opposite small shoulders each of which supports an O-ring 32. These O-rings are contacted by corresponding outwardly extending portions of the restrictor ring 30 to provide a fluid seal against passage of any of the thermoplastic material into the openings 33. The plurality of counterbored, nonthreaded, circumferentially spaced openings 33 are provided in the body 11. These openings extend from a downwardly facing shoulder 34 which circumferentially extends around the bottom portion 16 of the body 11. Cap screws 35 extend through the unthreaded openings 33 of the body 11 and are threadedly received in tapped bores 36 provided in the bottom of the restrictor ring 30.

Figure 4:
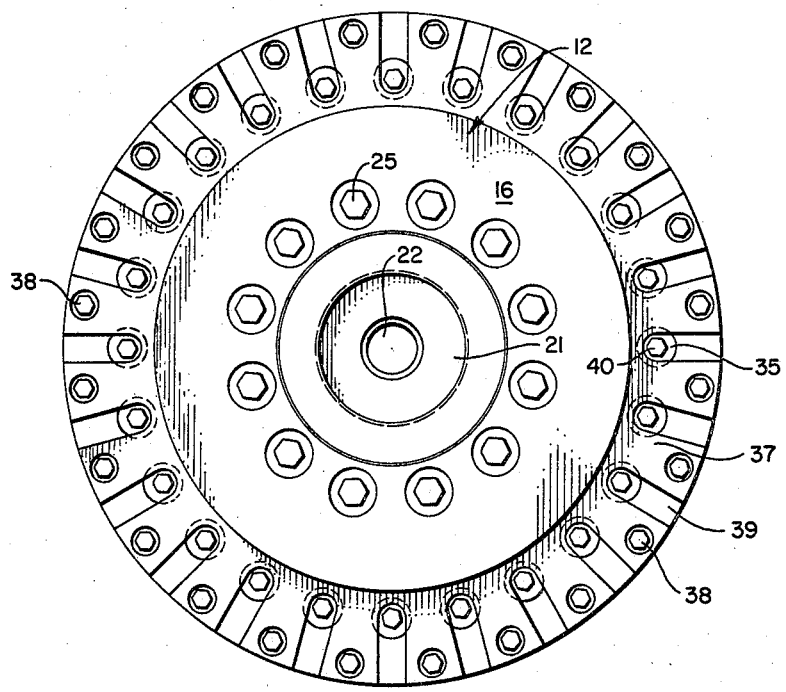
FIGURE 4 is a bottom view of the die depicted in FIGURES 1, 2 and 3.

As seen in FIGURES 2 and 4 an annular thrust plate 37 is seated against the downwardly facing shoulder 34 on body 11 and contacts the cap end of the cap screws 35. The thrust plate 37 is held securely to the shoulder 34 by means of small cap screws 38 threadedly received in openings provided in the circumferential portion of the lower part of body 11. As can be seen in FIGURE 4 the cap screws 38 are positioned at the outward extremity of the thrust plate 37. Radial slots 39 are provided in thrust plate 37 directly over each cap screw 35. The slots 39 have a width which are slightly in excess of the hexagonal head opening 40 provided in the top of each of the cap screws but slightly less than the diameter of the head of the cap screws. This permits a cap screw wrench to be inserted in the radial slots 39 to turn the cap screw 35 to adjust the spacing of the restrictor ring 30 from the downwardly facing shoulder 41 provided in the outer wall of the mandrel 12. An adjustable width passage 42 is thus provided between the top surface of restrictor ring 30 and the downwardly facing shoulder 41 provided on the mandrel 12. This radially directed passage 42 communicates the vertically extending annular passageway 18 with the vertically extending annular passageway 17 to provide a uniform flow of thermoplastic material upwardly through the die.

An adjustable outer lip ring 43 is attached to the top surface of the body 11 of the die by means of cap screws 44 projecting through countersunk openings provided in the ring 43 and threadedly received in tapped openings 45 provided in the top surface of body 11. The outer portion 45 of lip ring 43 is of increased thickness and extends down over and is slightly spaced away from the outer wall of the top portion of the cup 11. The outer portion 45 is provided with a plurality of radially extended threaded openings 46 in which are received hexhead bolts 47 which have a non-threaded extremity 48. By loosening cap screws 44 adjustment can be made to individual hex-head bolts 47 around the periphery of the lip ring 43 to adjust the spacing between the inner surface or inner lip 49 of ring 43 and the mandrel 12. The upper portion of the mandrel 12a has a slightly increased diameter at its topmost portion in the form of an outwardly facing annular band. This band defines the inner lip 50 of the die which in combination with outer lip 49 of the die sets the thickness of the wall of the extruded film. Adjustment in thickness of the film over relatively small or large areas can be obtained through the use of hex-head bolts 47 to change the spacing between the lips 49 and 50 around the circumference of the die. Thus variations in film thickness can be compensated for by quick adjustment of the lip ring 43 while the die is in use.

An annular hollow 51 is provided on the interior of lip ring 43 and permits the circulation of a heating medium, e.g, steam, hot oil, through the lip ring. A generally rectangular heating housing 52 may be attached to the exterior of the body 11 of the die assembly 10 to provide a generally rectangular channel 53 through which a heating or cooling medium may be circulated in order to heat or cool the die when desired.

It is understood that the mandrel portion 12 of the die will conveniently be provided with a heating medium such as hot oil or steam passages, or more conveniently may be provided with electric strip or rod heaters to furnish the necessary heat to keep the plastic in a semi-fluid state. Additionally, it is understood that service openings for air for the trapped bubble method of blowing tubular film and conduits for electrical leads, pressure probes, etc., can be provided in the mandrel 12.

By virtue of providing the adjustable lip ring 43 at the top of the die the outer lips 49 of the die are independently adjustable thus permitting compensation for non-concentricity of the annular shape of the body portion 11 of the die assembly. Since it is extremely difficult to machine a cylindrical surface with the precision required to produce extremely low mil thickness film (e.g., 0.5 mil) the adjustable ring 43 provides a means for compensating for the inaccuracies occurring when constructing the die. The massiveness and stability of the mandrel portion 12 of the die permit accurate positioning and alignment of the mandrel within the cup 11 whereby the spacing between the inner lip 50 on the mandrel and the outer lip 49 on the adjustable lip ring are substantially uniform through the entire circumferential space defining the thickness of the film. The adjustable restrictor ring 30 in the present die permits all spider produced weld lines to be washed out of the thermoplastic melt before it reaches the extrusion lips of the die.

In operation the die is assembled and attached to a conventional plastic extruder and the restrictor ring 30 is positioned to provide the widest gap possible in the space 41 between the top of the ring and the shoulder 41. After the extruder is started up and the tubular film is being extruded the bolts 35 are adjusted singularly around the perimeter of the die in order to raise the restrictor ring 30 gradually and uniformly toward the bottom of the downwardly facing shoulder 41 to begin to restrict the width of the passage 42 formed therebetween. The adjustments are continuing until all weld lines in the film are effectively removed. It should be noted that the die can be disassembled and cleaned without disturbing the setting of the restrictor ring 30. The use of the novel thrust plate cap screw anchor mechanism for the thrust ring makes it possible for a fixed setting to be maintained even though the die is disassembled.

The foregoing disclosure and description of the invention is illustrative and explanatory thereof and, in light thereof, it is apparent that other modifications will be obvious to those skilled in the art. Therefore, the present invention is to be limited only by the scope of the appended claims.

What is claimed:
1. A die for extruding thin wall, tubular, plastic material comprising:
   (a) a one-piece die body having a cylindrical recess therein, said recess having a large diameter upper portion, an intermediate diameter central portion, and a small diameter lower portion, said lower portion providing an axial opening in the bottom wall thereof,
      (i) a flat, radially extending, upwardly directed shoulder being provided by the inner wall of said body connecting said upper and middle portions of said recess, said shoulder providing an annular recess therein;
   (b) an adjustable annular restrictor ring received in said annular recess;
   (c) a cylindrical mandrel received in said cylindrical recess in said body, said mandrel having substantially the same shape as said cylindrical recess in said body but slightly smaller in diameter to provide a series of interconnected, separate annular spaces; and
   (d) common means for both raising and lowering said restrictor ring relative to the opposing surface of said cylindrical mandrel.
2. The die of claim 1 wherein said cylindrical mandrel is provided with a flat downwardly facing shoulder which is opposite of and which extends over a substantial portion of said annular member.
3. The die of claim 1 wherein the common means to position said annular member includes a plurality of screws having one end threadably engaging said annular member and the other end engaged by means to prevent axial movement of said screws.
4. The die of claim 1 wherein the lower portion of said cylindrical mandrel provides an axial recess in the bottom wall, said recess communicating with said annular spaces by means of a plurality of radially extending passageways.
5. The die of claim 1 wherein an outer lip ring is attached to the top of said die body by a plurality of screws threadedly received in said die body, said ring and the top portion of the upper cylindrical sidewall of said mandrel defining the die orifice, said ring being provided with an outer portion that extends down over and is spaced from the top portion of the outer wall of the die body, said outer portion having a plurality of radially mounted push screws threadedly received in opening provided therein whereby increments of the die orifice may be quickly changed to compensate for variations in film thickness.
6. The die of claim 3 wherein said means to position said annular member includes a thrust plate attached to the bottom of the said die body abutting a portion of the lower end of each of said screws.

References Cited
UNITED STATES PATENTS

| | | | |
|---|---|---|---|
| 2,405,039 | 7/1946 | Jesionowski. | |
| 3,212,134 | 10/1965 | Yokana | 18—14 |
| 3,296,662 | 1/1967 | Raley | 18—14 |
| 3,303,247 | 2/1967 | Carter et al. | 18—14 |
| 3,311,952 | 4/1967 | Kovach et al. | 18—14 |

FOREIGN PATENTS 1,013,865    8/1957    Germany.

WILLIAM J. STEPHENSON, Primary Examiner